United States Patent
Khalaj Amineh et al.

(10) Patent No.: US 10,190,404 B2
(45) Date of Patent: Jan. 29, 2019

(54) HIGH QUALITY VISUALIZATION IN A CORROSION INSPECTION TOOL FOR MULTIPLE PIPES

(71) Applicant: Halliburton Energy Services, Inc., Houston, TX (US)

(72) Inventors: Reza Khalaj Amineh, Houston, TX (US); Burkay Donderici, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 112 days.

(21) Appl. No.: 15/303,265

(22) PCT Filed: May 25, 2016

(86) PCT No.: PCT/US2016/033988
§ 371 (c)(1),
(2) Date: Oct. 11, 2016

(87) PCT Pub. No.: WO2017/011078
PCT Pub. Date: Jan. 19, 2017

(65) Prior Publication Data
US 2017/0191361 A1    Jul. 6, 2017

Related U.S. Application Data

(60) Provisional application No. 62/191,020, filed on Jul. 10, 2015.

(51) Int. Cl.
*E21B 47/00* (2012.01)
*E21B 47/09* (2012.01)
(Continued)

(52) U.S. Cl.
CPC ........ *E21B 47/0002* (2013.01); *E21B 47/082* (2013.01); *E21B 47/0905* (2013.01);
(Continued)

(58) Field of Classification Search
None
See application file for complete search history.

(56) References Cited

U.S. PATENT DOCUMENTS 5,270,647 A    12/1993  Beissner et al.
5,335,724 A *   8/1994  Venditto ............... E21B 23/006
                                                   166/250.1

(Continued)

OTHER PUBLICATIONS

Garcia et al., Successful Application of a New Electromagnetic Corrosion Tool for Well Integrity Evaluation in Old Wells Completed with Reduced Diameter Tubular, IPTC 16997 (need date).

(Continued)

*Primary Examiner* — Xiao M Wu
*Assistant Examiner* — Steven Z Elbinger
(74) *Attorney, Agent, or Firm* — Benjamin Fite; Tumey L.L.P.

(57) ABSTRACT

A method includes conveying a pipe inspection tool including one or more sensors into a wellbore having at least one pipe, transmitting an excitation signal from the pipe inspection tool and measuring response signals with the sensors, and processing the response signals to obtain measured responses. A map of the pipe is then generated based on the measured responses, where the map is divided into pipe ranges extending along the length of the pipe and each pipe range corresponds to a percentage of metal loss in the pipe. A photorealistic image is assigned to each pipe range based on the percentage of metal loss, and a two-dimensional (2D) or three-dimensional (3D) image is then generated as a combination of each photorealistic image. The 2D or 3D image is then graphically visualized.

19 Claims, 5 Drawing Sheets

(51) Int. Cl.
*G01V 3/28* (2006.01)
*G01V 3/30* (2006.01)
*E21B 47/08* (2012.01)
*E21B 47/10* (2012.01)
*E21B 47/12* (2012.01)
*G01V 3/34* (2006.01)
*G01V 3/38* (2006.01)

(52) U.S. Cl.
CPC ............ *E21B 47/10* (2013.01); *E21B 47/122* (2013.01); *G01V 3/28* (2013.01); *G01V 3/30* (2013.01); *G01V 3/34* (2013.01); *G01V 3/38* (2013.01); *E21B 47/00* (2013.01)

(56) References Cited

U.S. PATENT DOCUMENTS

| | | | | |
|---|---|---|---|---|
| 2004/0100256 | A1* | 5/2004 | Fickert | E21B 47/082 324/221 |
| 2006/0050092 | A1* | 3/2006 | Bondurant | G06T 7/0004 345/664 |
| 2009/0195244 | A1 | 8/2009 | Mouget et al. | |
| 2011/0203375 | A1* | 8/2011 | Farthing | G01N 29/07 73/628 |
| 2013/0009049 | A1 | 1/2013 | Smaardyk et al. | |
| 2013/0043381 | A1* | 2/2013 | Smaardyk | E21B 43/04 250/269.1 |
| 2014/0100442 | A1* | 4/2014 | Begin | A61B 8/466 600/411 |
| 2014/0368191 | A1* | 12/2014 | Goroshevskiy | G01N 27/85 324/201 |
| 2016/0076926 | A1* | 3/2016 | McCann | G01N 33/2823 73/152.29 |
| 2016/0326844 | A1* | 11/2016 | Samuel | E21B 12/02 |

OTHER PUBLICATIONS

Arbuzov et al., Memory Magnetic Imaging Defectoscopy, SPE 162054 (need date).

ISR/WO for PCT/US2016/033988 dated Aug. 16, 2016.

* cited by examiner

HIGH QUALITY VISUALIZATION IN A CORROSION INSPECTION TOOL FOR MULTIPLE PIPES

BACKGROUND

After drilling a wellbore in the oil and gas industry, the drilled wellbore can be subsequently completed by cementing a string of metal pipes connected end-to-end within the wellbore. Commonly called "casing," such pipes increase the integrity of the wellbore and provide a flow path between the Earth's surface and selected subterranean formations. Some wellbores are lined with multiple concentrically positioned pipes (i.e., concentric strings of casing). Moreover, in some wellbores, one or more production pipes are extended into a cased wellbore to provide a conduit for hydrocarbons to be conveyed to the earth's surface. Accordingly, as used herein, the term "pipe" or "wellbore pipe" will refer to metal pipes or pipelines that line the walls of a wellbore (e.g., casing) but may also refer to a string of production pipes or tubulars extended into a wellbore.

During the lifetime of a well, wellbore pipes are exposed to high volumes of materials and fluids required to pass through them, including chemically aggressive fluids. In harsh environments, the pipes may be subject to corrosion that may adversely affect their functionality over time. Consequently, the structural integrity of wellbore pipes may change over time due to chemical and mechanical interaction. Moreover, due to the length, volume, accessibility difficulties, and long time periods associated with the process, it is a costly task to monitor wellbore pipes and pipelines and intervene when required.

Electromagnetic (EM) sensing technologies and techniques have been developed for such monitoring applications and can generally be categorized into two groups: frequency-domain techniques and time-domain techniques. In frequency-domain techniques, measurements of the wellbore pipes are typically performed at high frequencies to characterize the innermost pipes and at low frequencies to characterize the outermost wellbore pipes. Time-domain techniques are based on the pulse eddy current and employ the transient response (decay response versus time) of the pipes to a pulse excitation. Proper analysis of the signal responses can determine metal losses in the pipes with better resolution, and improve the robustness of the characterization process to noise.

Visualization of the inspection results helps facilitate a more accurate evaluation of the wellbore pipes, which can lead to informed decisions about how to address the current condition of the pipes. The ultimate goal is to have a proper assessment of the current condition of the wellbore pipes so that, if needed, repair or replacement strategies can be implemented in a timely manner.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, without departing from the scope of this disclosure.

DETAILED DESCRIPTION

The present disclosure is related to maintenance of wellbores in the oil and gas industry and, more particularly, to monitoring and evaluating corrosion in wellbore pipes, such as strings of casing or production tubing.

Various methods are described herein that provide high quality visualization of inspection results for multiple pipes in cased boreholes. The methods may provide visualization details of the pipes along axial, azimuthal, and radial directions. Analysis of current pipe conditions is an important objective, as pipe removal (especially casing) from wellbores can be both expensive and time consuming, particularly in offshore operations. Analyzing and visualizing wellbore pipes in high detail apprises a well operator of current downhole conditions and allows the well operator to make informed decisions as to what remedial actions, if any, are needed to resolve various defects associated with the wellbore pipes. Detailed images of these pipes will allow for better interpretation and determination of the integrity of the pipes, which, in turn, leads to significant financial advantages during the production process.

Approaches are described herein to visualize responses obtained from a pipe inspection tool with higher quality when monitoring multiple wellbore pipes. In some embodiments discussed herein, high quality visualization of various pipe features such as collars, metal gain sections, metal loss sections, deformed sections, perforations, etc. may be obtained. In other embodiments, high quality visualization of defects in the pipes may be obtained with the size and type of the displayed defects being proportional to the evaluated amount of metal loss for the pipes. In yet other embodiments discussed herein, a display of the pipes, including defected and non-defected pipes or only the defected pipes, may be visualized in a single multilayer or separate image formats that include proper colors and shading representative of the defects. In embodiments where the pipe inspection tool provides azimuthal measurements, any of the above-mentioned features may be displayed across particular or desired azimuthal angles. Moreover, in some embodiments, any of the above-mentioned features may be displayed in a two-dimensional (2D) or a three-dimensional (3D) format.

Figure 1:
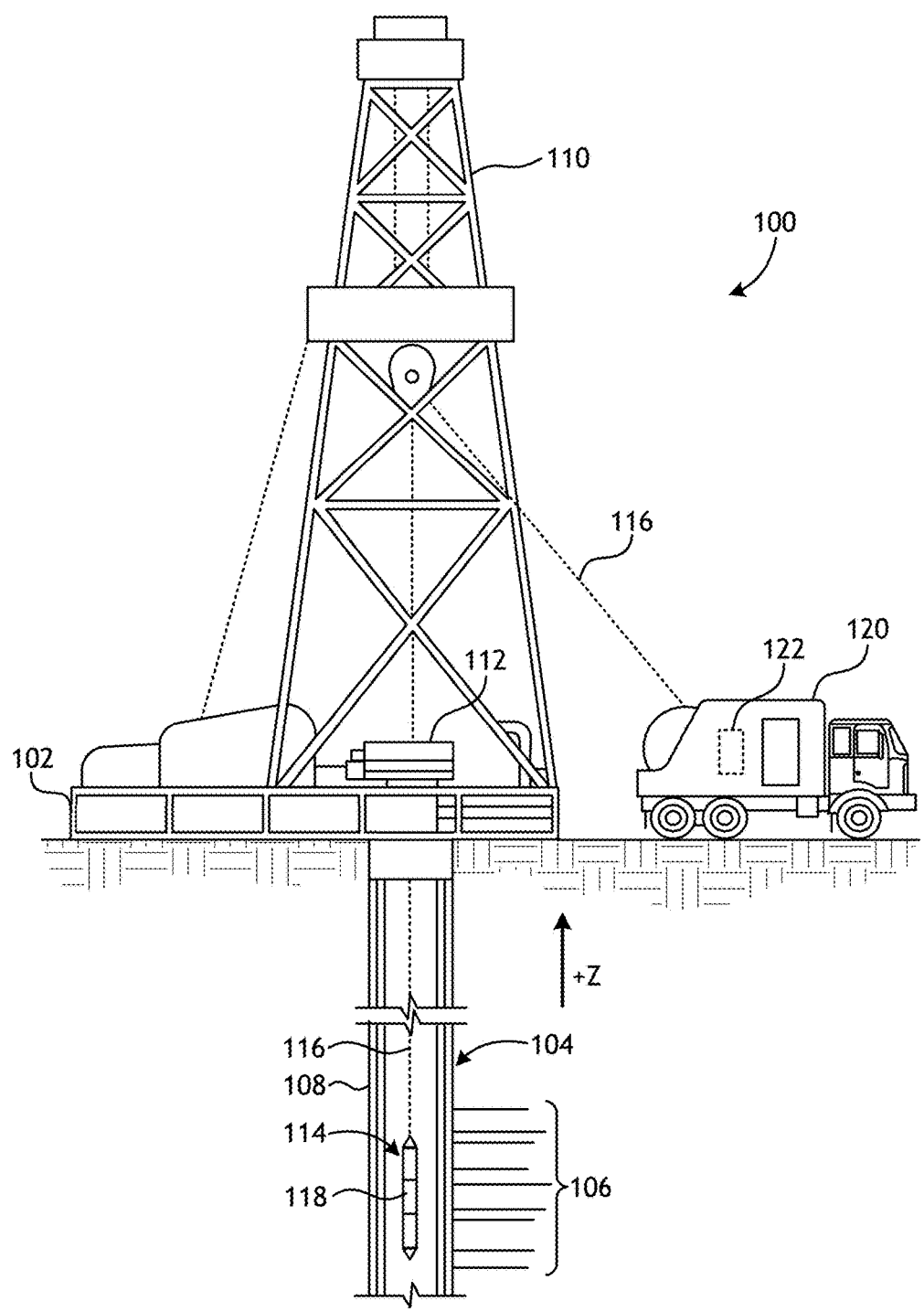
FIG. 1 is a schematic diagram of an exemplary wireline system that may employ the principles of the present disclosure.

FIG. 1 is a schematic diagram of an exemplary wireline system 100 that may employ the principles of the present disclosure, according to one or more embodiments. As illustrated, the wireline system 100 may include a surface platform 102 positioned at the Earth's surface and a wellbore 104 that extends from the surface platform 102 into one or more subterranean formations 106. In other embodiments, such as in offshore operations, a volume of water may separate the surface platform 102 and the wellbore 104. The wellbore 104 may be lined with one or more pipes 108, also referred to as strings of casing. In some embodiments, portions of the wellbore 104 may have only one pipe 108 positioned therein, but other portions of the wellbore 104 may be lined with two or more concentrically disposed pipes 108. The pipes 108 may be made of plain carbon steel, stainless steel, or another material capable of withstanding a variety of forces, such as collapse, burst, and tensile failure.

The wireline system 100 may include a derrick 110 supported by the surface platform 102 and a wellhead installation 112 positioned at the top of the wellbore 104. A pipe inspection tool 114 may be suspended into the wellbore 104 on a cable 116. In some embodiments, the pipe inspection tool 114 may alternatively be suspended within production tubing or pipe (not shown) positioned within the pipes 108 that line the wellbore 104 (i.e., casing). In such embodiments, the production tubing may extend by itself into the pipes 108 or alternatively be positioned adjacent one or more eccentrically located production pipes that are also positioned within the pipes 108. Accordingly, the pipes 108 may refer to strings of casing lining the wellbore 104 or at least one production pipe extended within casing that lines the wellbore 104.

The pipe inspection tool 114 may comprise an electromagnetic, non-destructive inspection tool. The pipe inspection tool 114 may comprise one of a frequency-domain Eddy current tool or a time-domain Eddy current tool. Accordingly, its operation may be based on either the flux-leakage principle or the eddy-current principle, or a combination of both. Moreover, the pipe inspection tool 114 may be insensitive to non-conductive deposits and is operable irrespective of the nature of the fluid mixture flowing into/out of the wellbore 104. The pipe inspection tool 114 can be used for the detection of various features associated with the pipes 108, such as, but not limited to, a pipe collar, a metal gain region, a metal loss region, a deformed region, one or more perforations defined in the pipes 108, localized damage, a defect, and corrosion in the pipes 108. Such features can either be man-made or caused by corrosion. Accordingly, the term "feature" as used herein refers not only to structural components or parts of the pipe 108, but also to defects or damage formed or otherwise present on the pipe 108.

In operation, the pipe inspection tool 114 subjects the pipes 108 to a strong static magnetic field and, due to the ferromagnetic nature of the pipes 108, the magnetic return flux is mainly confined to the inside of the pipes 108. In the presence of discontinuities or defects in the metal, such as any of the features listed above, changes in the magnetic field can be detected with one or more electromagnetic sensors 118 included in the pipe inspection tool 114.

The electromagnetic sensors 118 may be communicably coupled to the cable 116, which may include conductors for conveying power to the pipe inspection tool 114 and also for facilitating communication between the surface platform 102 and the pipe inspection tool 114. A logging facility 120, shown in FIG. 1 as a truck, may collect measurements obtained by the electromagnetic sensors 118, and may include computing devices 122 for controlling, processing, storing, and/or visualizing the measurements gathered by the electromagnetic sensors 118. The computing devices 122 may be communicably coupled to the pipe inspection tool 114 by way of the cable 116.

The electromagnetic sensors 118 may include one or more electromagnetic coil antennas that may be used as transmitters, receivers, or a combination of both (i.e., transceivers) for obtaining in situ measurements of the pipe(s) 108. In some embodiments, the electromagnetic sensors 118 may be designed to operate in a centralized position within the innermost pipe 108, such as through the use of one or more centralizers (not shown) attached to the body of the pipe inspection tool 114. In other embodiments, however, the electromagnetic sensors 118 may be designed to be adjacent or in intimate contact with the inner wall of the innermost pipe 108. In such embodiments, the electromagnetic sensors 118 may be mounted on one or more deployable sensor pads (not shown) positioned on actuatable arms that move the electromagnetic sensors 118 radially outward toward the inner wall of the innermost pipe 108.

Figure 2:
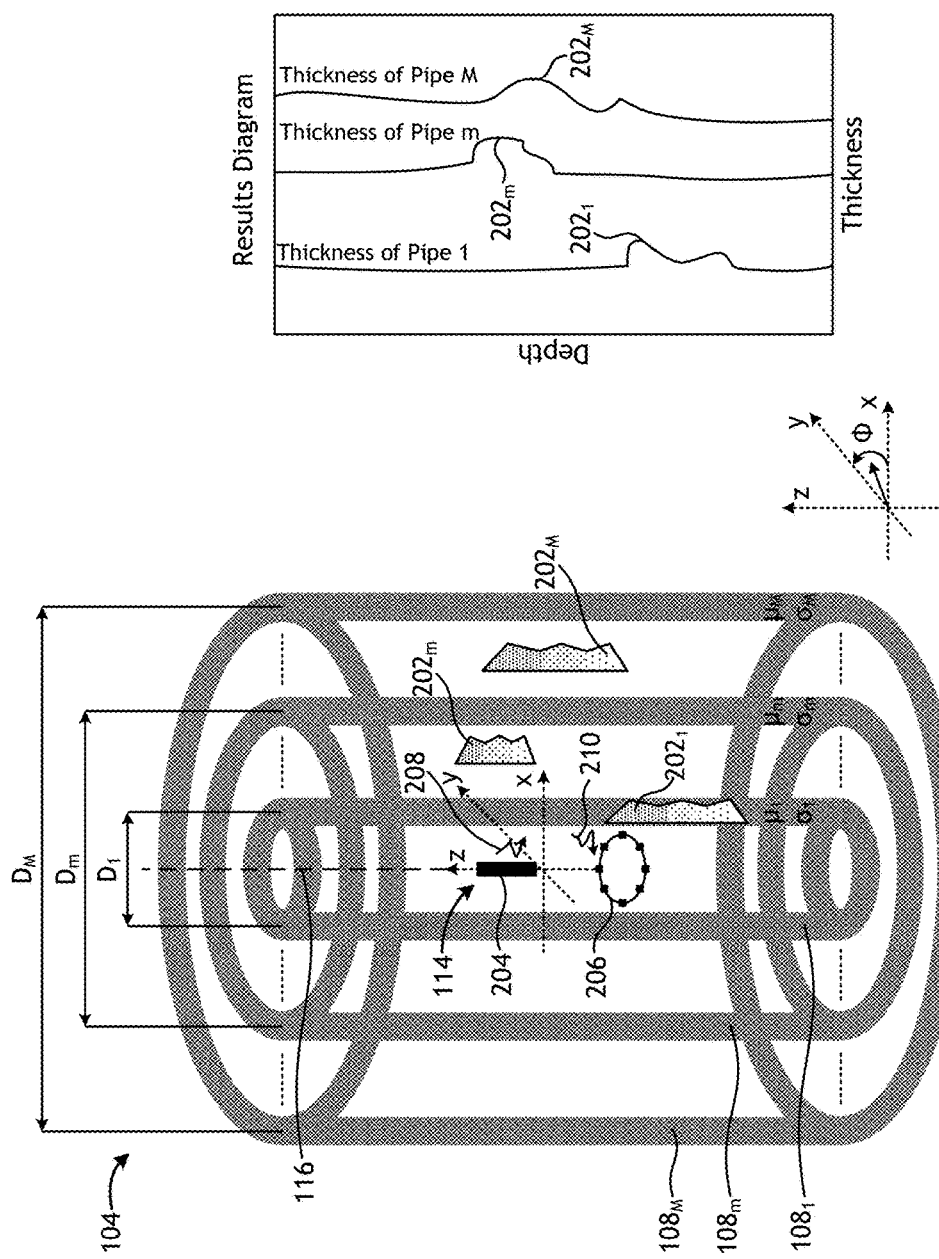
FIG. 2 is a schematic diagram and associated visualization graph of a portion of the wellbore of FIG. 1.

FIG. 2 depicts one method of obtaining wellbore pipe measurements from the pipe inspection tool 114. As illustrated, a first pipe $108_1$, a second or "m-th" pipe $108_m$, and a third or "M-th" pipe $108_M$ may each be positioned within the wellbore 104. The first pipe $108_1$ is arranged within the m-th pipe $108_m$, and the m-th pipe $108_m$ is arranged within the M-th pipe $108_M$. As will be appreciated, usage of m and M is intended to show that any number of pipes 108 may be used, without departing from the scope of the disclosure. In some embodiments, the pipes $108_1$, $108_m$, $108_M$ may each line the wellbore 104 as concentrically positioned strings of casing separated by interposing layers of cement. In other embodiments, however, at least the first pipe $108_1$ may comprise a production pipe or tubing positioned within the m-th pipe $108_m$ either concentric or eccentric to the remaining pipes $108_m$, $108_M$.

The first pipe $108_1$ has an outer diameter $D_1$, the m-th pipe $108_m$ has an outer diameter $D_m$, and the M-th pipe $108_M$ has an outer diameter $D_M$, where $D_1 < D_m < D_M$. Moreover, each pipe $108_{1-M}$ may exhibit a corresponding magnetic permeability and conductivity, represented in FIG. 2 as $\mu_1$, $\mu_m$, and $\mu_M$, and $\sigma_1$, $\sigma_m$, and $\sigma_M$, respectively. In some embodiments, the magnetic permeability $\mu_1$, $\mu_m$, and $\mu_M$ of each pipe $108_{1-M}$ may be the same, but may alternatively be different. Similarly, in some embodiments, the conductivity $\sigma_1$, $\sigma_m$, and $\sigma_M$ of each pipe $108_{1-M}$ may be the same, but may alternatively be different.

Each pipe $108_1$, $108_m$, $108_M$ may include none or at least one defect 202, such as a location of corrosion. As shown in FIG. 2, the first pipe $108_1$ has a first defect $202_1$, the m-th pipe $108_m$ has a second defect $202_m$, and the M-th pipe $108_M$ has a third defect $202_M$. The defects $202_1$, $202_m$, $202_M$ may be present on the inner or outer surfaces of the pipes $108_1$, $108_m$, $108_M$, or both. Moreover, the defects $202_1$, $202_m$, $202_M$ may comprise any of the pipe features mentioned herein, not just corrosion or damage.

The pipe inspection tool 114 may be conveyed into the wellbore 104 on the cable 116 and used to analyze the integrity of the pipes $108_1$, $108_m$, $108_M$ and thereby locate and identify the defects $202_1$, $202_m$, $202_M$. As illustrated, the pipe inspection tool 114 may include an excitation source 204, such as a transmitter coil or antenna, and one or more sensors 206. In the illustrated embodiment, the sensors 206 are depicted as an azimuthally distributed sensor array. In other embodiments, however, the sensors 206 may be separated from each other in the axial direction along the length or longitudinal axis of the wellbore 104, without departing from the scope of the disclosure. The excitation source 204 may be configured to produce an excitation signal 208 (i.e., a magnetic field), and the sensors 206 may be configured to detect a response signal 210 (i.e., a return magnetic field) after having interacted with one or more of the pipes $108_1$, $108_m$, $108_M$.

In some embodiments, the response signals 210 obtained by the pipe inspection tool 114 may be transmitted via the cable 116 to the logging facility 120 (FIG. 1) for processing. In such embodiments, the computing devices 122 (FIG. 1) associated with the logging facility 120 may receive and process the response signals 210 and thereby generate measured responses corresponding to one or more of the defects $202_1$, $202_m$, $202_M$. Alternatively, the pipe inspection tool 114 may include proper computing equipment and the response signals 210 may instead be processed downhole to obtain the measured responses corresponding to one or more of the defects $202_1$, $202_m$, $202_M$. In such embodiments, the measured responses may subsequently be transmitted to the logging facility 120 for consideration by a well operator, for example. In other embodiments, however, the measured responses may be stored in a memory included in the pipe inspection tool 114 and accessed upon returning the pipe inspection tool 114 to the surface of the well.

By processing of the response signals 210 from the sensors 206, the pipes $108_{1-M}$ may be evaluated to locate and characterize the defects $202_1$, $202_m$, $202_M$. In some cases, the measured responses may be visualized for consideration by a well operator. The accompanying line graph in FIG. 2 illustrates one example of visualizing the measured responses obtained from the multiple-pipe inspections undertaken by the pipe inspection tool 114. More particularly, the line graph depicts the estimated thicknesses for each pipe $108_{1-M}$ plotted versus depth within the wellbore 104. As illustrated, the defects $202_1$, $202_m$, $202_M$ are visualized as a variation in the thickness magnitude corresponding to the relative depth within the wellbore 104.

The methods described herein provide for the visualization of the measured responses from the pipe inspection tool 114 with high quality two-dimensional (2D) or three-dimensional (3D) images when monitoring a wellbore 104 containing multiple pipes $108_{1-M}$. The presently described methods are proposed to provide the maximum possible information regarding characterization of the pipes $108_{1-M}$, such as the presence of any defects $202_{1-M}$ or any of the other features mentioned herein. In a multiple-pipe inspection process, all or some of the presently described methods can be employed to visualize the conditions and integrity of the pipes $108_{1-M}$.

Figure 3A:
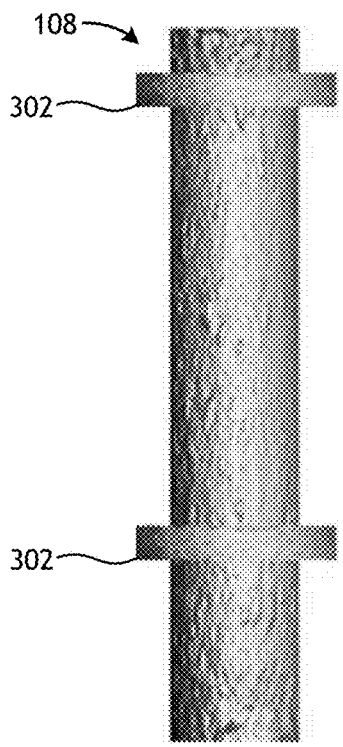
FIGS. 3A-3D depict example features of pipes that may be visualized according to the methods described herein.
Figure 3B:
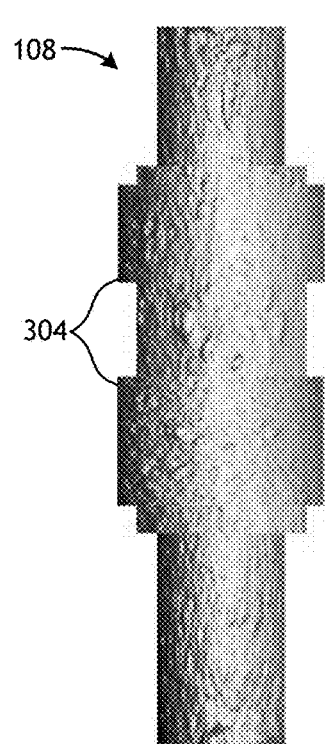
Figure 3C:
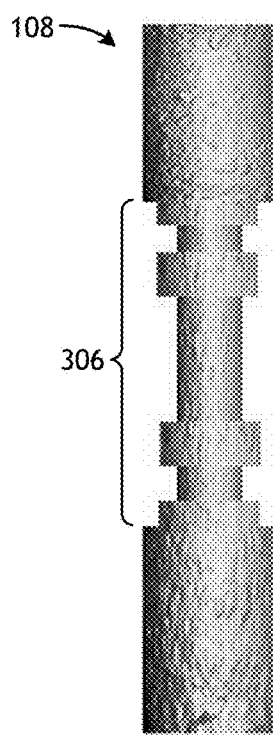
Figure 3D:
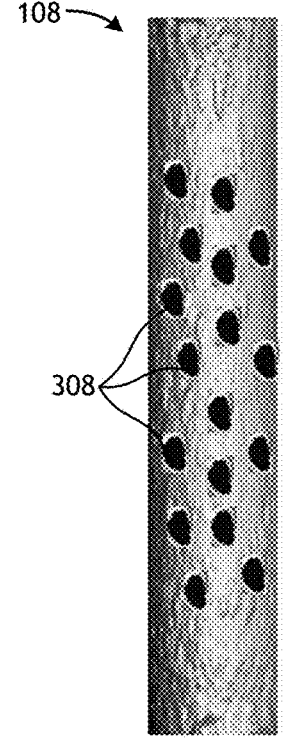

FIGS. 3A-3D provide a graphical representation (visualization) of various features that may be visualized, according to embodiments of the present disclosure. More particularly, FIGS. 3A-3D each depict a three-dimensional (3D) image of a wellbore pipe 108, and each pipe 108 provides at least one feature visualized using the methods described herein. Example features of the pipes 108 that may be visualized include, but are not limited to, pipe collars 302, as shown in FIG. 3A, metal gain regions 304, as shown in FIG. 3B, a deformed region 306, as shown in FIG. 3C, and one or more perforations 308 defined in the pipe 108, as shown in FIG. 3D. Each of these features 302, 304, 306, 308 comprises man-made features included on the respective pipes 108, but could alternatively represent defect features, such as corrosion, cracks, fissures, holes, etc. In the presently described methods, each feature 302, 304, 306, 308 can be displayed and otherwise visualized as a high quality 2D or 3D image.

Pipe collars 302 are threaded pipe components commonly used to connect two joints of wellbore pipe 108, such as casings or production tubing. Accordingly, the presence of pipe collars 302 is commonly repeated along the length of the strings of pipe 108 extended into a wellbore. The position of a pipe collar 302 along the length of the wellbore pipe 108 may be detected as a sharp local increase in response change of the pipe inspection tool 114 (FIGS. 1 and 2) at a proper frequency (if a frequency-domain tool is employed) or at a proper response time (if a time-domain tool is employed). For the purpose of graphically displaying the pipe collars 302, the size of the pipe collars 302 can be pre-known or otherwise obtained from an inversion algorithm that processes the measured response. Alternatively, the size of the pipe collars 302 as visualized may comprise any arbitrary size used to indicate their presence along the pipe 108. In visualizing the pipes 108, in some embodiments, a predetermined or associated color and/or shading can be employed to display or indicate the presence of a pipe collar 302.

The metal gain region 304 and the deformed region 306 (e.g., a metal loss region) shown in FIGS. 3B and 3C, respectively, can be detected from the measured responses of the pipe inspection tool 114 (FIGS. 1 and 2) and applying a proper inversion algorithm thereto. If the pipe inspection tool 114 does not provide or facilitate azimuthal measurements of the pipe 108, the displayed features will be azimuthally symmetric with their size (magnitude) being proportional to the equivalent amount of metal gain region 304 or deformed region 306 obtained from the inversion algorithm. However, if the pipe inspection tool 114 is able to provide azimuthal measurements, such as through the use of an azimuthal array of sensors (e.g., the sensors 206 of FIG. 2), the features may be visualized in the relevant azimuthal angle and their size may be proportional to the results obtained from the inversion algorithm.

The perforations 308 of the wellbore pipe 108 in FIG. 3D can be visualized with a section of the pipe 108 that includes a plurality of holes. The size of the perforations 308 can be pre-known, such as in the case of man-made perforations defined in casing or production tubing to facilitate fluid communication therethrough. Alternatively, the size and/or number of the perforations 308 may be initially unknown (e.g., formed because of corrosion or other damage) but obtained (calculated) from an inversion algorithm that processes the measured responses. In yet other embodiments, the size and/or number of the perforations 308 can be arbitrarily drawn for illustration purposes. The axial length of the region of the pipe 108 that includes the perforations 308, however, may be detected and otherwise ascertained from the results of the inversion algorithm.

Figure 4:
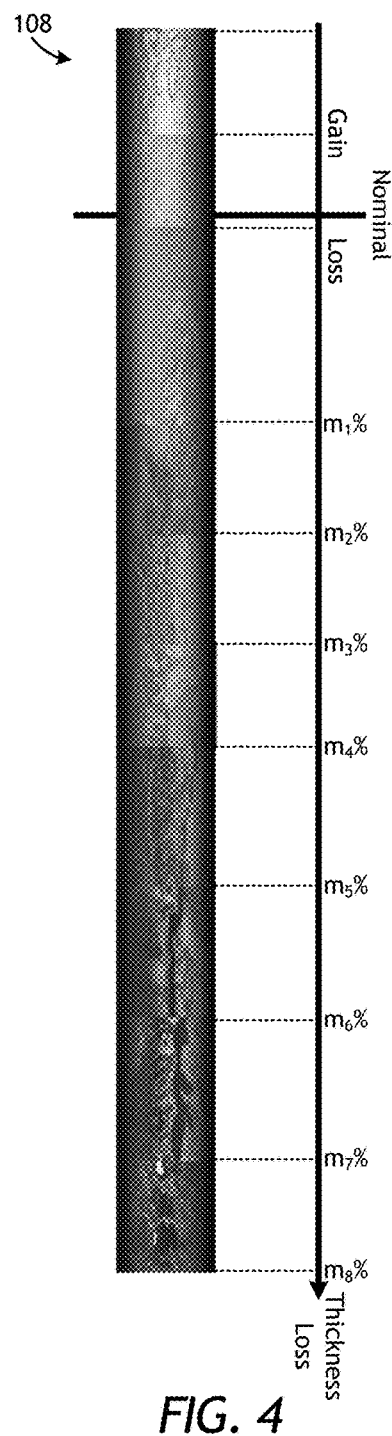
FIG. 4 depicts an example visualization display of metal loss regions with various amounts of metal loss.

Pipes with various defect features, such as corrosion, cracks, fissures, holes, etc., can be visualized with their respective sizes being proportional to the equivalent amount of metal loss as evaluated from the inversion algorithms. For example, FIG. 4 shows an example of displayed metal loss regions with various amounts of metal loss along the length of the pipe 108, according to one or more embodiments. In the example shown in FIG. 4, it is assumed that the equivalent amount of metal loss has been computed in percentage with respect to the non-defected sections of the pipe 108 with the metal loss values ranging from $m_1\%$ to $m_8\%$ and sorted in ascending order of magnitude. In the illustrated embodiment, $m_1 < m_2 \ldots < _8$.

As demonstrated in FIG. 4, the sections of the pipe 108 with smaller percentages of metal loss (e.g., $m_1\%$-$m_4\%$) are graphically visualized with smaller defects (e.g., smoother or more uniform surfaces, etc.). As the percentage of metal loss increases (e.g., $m_5\%$-$m_8\%$), however, the size of the defects correspondingly increases and other types of graphics representative of larger defects, such as holes, cracks, fissures, etc., may be graphically visualized in the in each pipe range $m_5$-$m_8$ as well. Accordingly, the size and type of the graphically visualized features may correspond to the percentage of the metal loss evaluated from the inversion algorithms. In some embodiments, predetermined (e.g., proper) colors and/or shading may be employed to provide high quality images of the defected regions of the pipe 108.

In FIG. 4, each pipe range $m_1\%$-$m_8\%$ is mapped to a different photorealistic image corresponding to the percentages of metal loss. For example, a metal thickness loss of $m_1\%$ to $m_2\%$ is displayed with a certain selected image of the pipe 108, while a thickness loss ranging between $m_2\%$ and $m_3\%$ is displayed with a different selected image of the pipe 108. As will be appreciated, this forms a visual map comprised of corresponding photorealistic images between each pipe range $m_1\%$-$m_8\%$. As used herein, the term "photorealistic image" is defined as an image that is obtained from an actual device, such as a camera or similar image capture mechanism. Alternatively, the term "photorealistic image" could refer to a shaded or colored rendering of an actual 3D graphical model with a surface texture image and reflectivity that resembles a real photograph.

Accordingly, the map may be constructed of different photorealistic images across each pipe range $m_1\%$-$m_8\%$. In such embodiments, a first two-dimensional (2D) image or three-dimensional (3D) image may be formed using the map, where the first 2D or 3D image is constructed as a collage (combination) of the various photorealistic images. In some embodiments, the different photorealistic images may be obtained by taking actual photographs of real pipes with similar measured features and defects. In other embodiments, the different photorealistic images may be obtained as a projection of a 3D pipe model. In such embodiments, the different photorealistic images may be mapped to a range of pipe parameters that contain the parameter value associated with the 3D pipe model. Example pipe parameters that may be taken into account include any electromagnetic or geometric property of the pipe 108 such as, but not limited to, pipe thickness, pipe diameter, pipe magnetic permeability, pipe eccentricity, pipe conductivity, defect size, perforation density, perforation count, existence of a pipe collar, pipe collar thickness, and the like. Consequently, each photorealistic image of pipes with defects may be mapped to a range of pipe parameters that contain the parameter value of the real pipes.

The photorealistic images may then be combined to form a composite photorealistic image for visualization. In order to generate the composite photorealistic image, sets of depths that correspond to each range of pipe parameters may first be generated for a given thickness loss profile (such as that depicted in FIG. 5). In FIG. 4, for example, seven different pipe parameter ranges are identified: $m_1\%$-$m_2\%$, $m_2\%$-$m_3\%$, . . . , $m_7\%$-$m_8\%$. Consecutive depths in each depth set may then be grouped into corresponding pipe ranges, where each pipe range consists of a start depth and an end depth. Finally, a photorealistic image that corresponds to each pipe parameter range is drawn (generated) in each pipe range associated with the pipe parameter range in a plot where at least one dimension is depth, as shown in FIG. 5.

The first 2D or 3D image may then be displayed on a computer screen or in printed media, such as might be available in the logging facility 120 (FIG. 1). In some embodiments, a second 2D or 3D image for a second pipe may be constructed using the map. In such embodiments, the first 2D/3D image and the second 2D/3D image may be combined to generate a third 2D/3D image. Moreover, combining the first 2D/3D image and the second 2D/3D image may entail at least one of stretching the first 2D/3D image on top of the second 2D or 3D image, and overlaying the first 2D/3D image on top of the second 2D/2D image.

When a map between a photorealistic image and a pipe parameter range is generated, each photorealistic image may represent and otherwise correspond to at least one of the pipe parameters. A more complicated map can then be formed so that each photorealistic image represents multiple pipe parameters simultaneously (such as defects in view of pipe diameter). Moreover, some or all of the photorealistic images can be cropped or otherwise adjusted such that when they are placed in the composite image, multiple depth ranges corresponding to the same pipe parameter range do not appear identical but nonetheless appear continuous. Accordingly, the photorealistic images may share a common longitudinal axis that corresponds with the depth along a portion of a wellbore.

Figure 5:
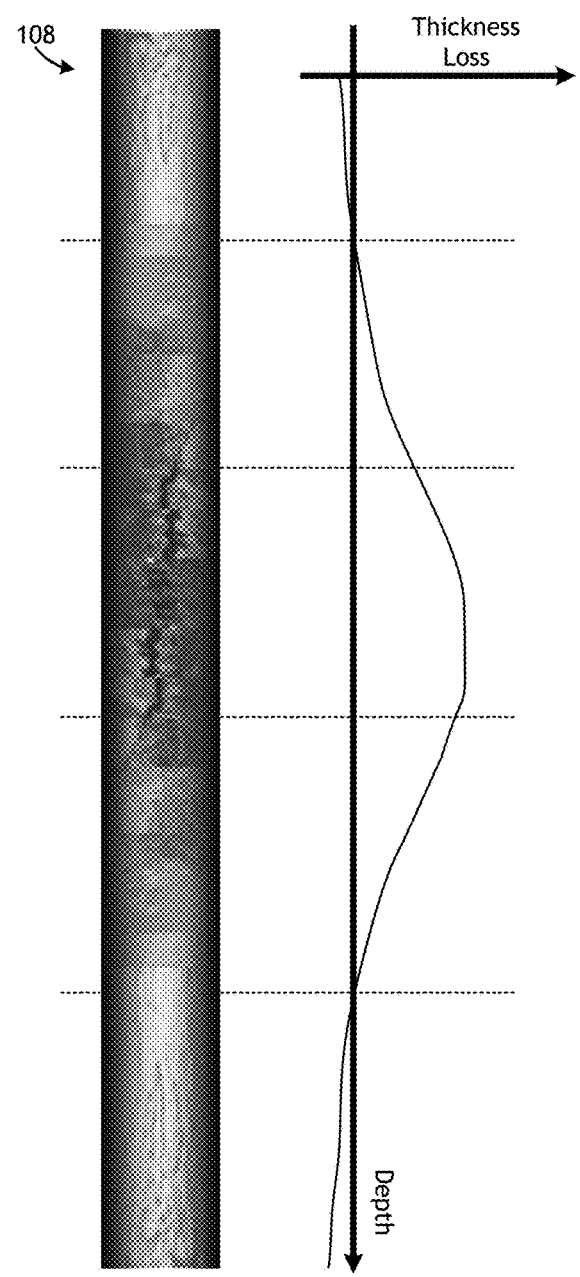
FIG. 5 depicts a sample visualization of a pipe with regions of various metal loss and metal gain.

FIG. 5 depicts a sample visualization of the pipe 108 with depth regions of various metal loss and metal gain sizes, according to one or more embodiments. As illustrated, the pipe 108 may contain several depth regions with different amounts of metal loss and metal gain. As a result, a proper display format may be used for each corresponding region and the combined photorealistic images may share a common longitudinal axis that corresponds to particular depth ranges along a wellbore. If the sensors of the pipe inspection tool 114 (FIGS. 1 and 2) are azimuthally symmetrical, the equivalent metal loss at each depth location may be obtained using an inversion algorithm. In such cases, the graphical visualization of the defected region will not show the defected region according to the true azimuthal angle. On the other hand, if azimuthally sensitive sensors are employed in the pipe inspection tool 114, as shown in FIG. 2, the displayed defected region can be visualized at various azimuthal angles according to the acquired responses and the results of the inversion algorithm.

Figure 6A:
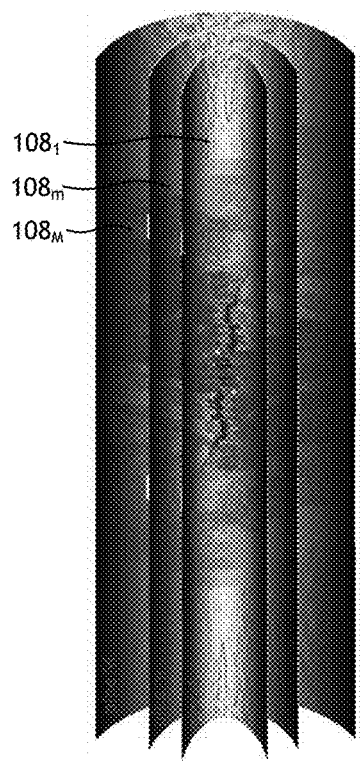
FIG. 6A depicts a multi-layer image format of multiple pipes with corresponding visualized features.
Figure 6B:
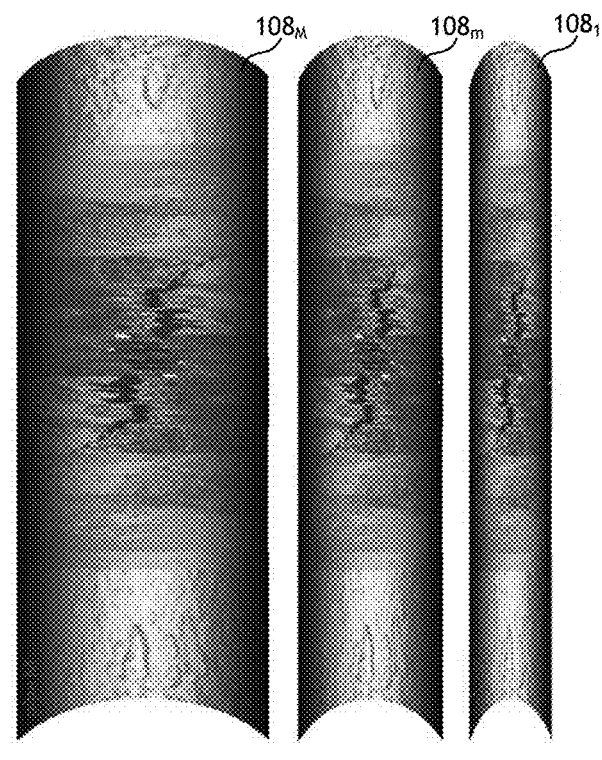
FIG. 6B depicts a separate image format of multiple pipes with corresponding visualized features.

FIG. 6A depicts multiple pipes $108_{1-M}$ graphically visualized in a single multilayer image format, and FIG. 6B depicts the multiple pipes $108_{1-M}$ in a separate image format. When inspecting multiple pipes $108_{1-M}$, all the pipes $108_{1-M}$ or only the defected pipes $108_{1-M}$ can be graphically visualized in a multi-layer image, as shown in FIG. 6A. More specifically, the multi-layer image may provide a nested, concentric image of the pipes $108_{1-M}$. Alternatively, as shown in FIG. 6B, the pipes $108_{1-M}$ and their various features may be visualized in separate images.

In each of FIGS. 6A and 6B, the pipes $108_{1-M}$ are each graphically visualized with corresponding features, and the corresponding features are depicted with proper (predetermined) colors and/or shading representative of the features. Each image in FIG. 6B, for example, contains the features relevant to the corresponding pipe $108_{1-M}$. As will be appreciated, this may prove advantageous in helping to distinguish features on one pipe $108_{1-M}$ from similar or different features on the other pipes $108_{1-M}$.

As indicated above, graphical visualization of the wellbore pipes and their features can be in two-dimensional (2D) or three-dimensional (3D) format. FIGS. 6A and 6B depict visualization of the wellbore pipes $108_{1-M}$ in a 2D format. If the pipe inspection tool 114 (FIGS. 1 and 2) used to obtain the measured responses includes azimuthally sensitive sensors 206 (FIG. 2), however, the wellbore pipes $108_{1-M}$ may be graphically visualized in a 3D format. Similar to the 2D format, in 3D format all the pipes $108_{1-M}$, or only the defected pipes $108_{1-M}$, can be shown in a single multilayer 3D image. In such 3D images, the pipes $108_{1-M}$ and the features associated therewith can be graphically visualized with proper colors and/or shading such that the features on one pipe $108_{1-M}$ can be distinguished from the features on the other pipes $108_{1-M}$. Alternatively, the pipes $108_{1-M}$ and their respective features may be graphically visualized in separate 3D images, where each image contains the features relevant to the corresponding pipe $108_{1-M}$. In the 3D image format, a user may be able to rotate the pipes $108_{1-M}$ and get various views from desired angles.

With a 2D or 3D photorealistic graphical visualization, a well operator may be able to make informed decisions as to what downhole operations should be undertaken in the well. In some embodiments, for instance, the photorealistic graphical visualization may inform the well operator that a remedial action may be needed to resolve various defects associated with the wellbore pipes $108_{1-M}$. Such remedial actions can include, but are not limited to, excising a portion of the wellbore pipes $108_{1-M}$ and replacing the excided portion with a new portion, installing a patch across a defected portion of the wellbore pipes $108_{1-M}$, and performing a cement squeeze operation to fill in cracks, fissures, or holes formed in the wellbore pipes $108_{1-M}$. In other embodiments, the photorealistic graphical visualization may inform the well operator that additional logging (analysis) of the well may be required. In some embodiments, the photorealistic graphical visualization may inform the well operator that drilling of the well may re-commence. In some embodiments, the photorealistic graphical visualization may inform the well operator that production operations in the well may commence or should be suspended. In some embodiments, the photorealistic graphical visualization may inform the well operator that completion operations should be undertaken at a certain location in the well.

Figure 7:
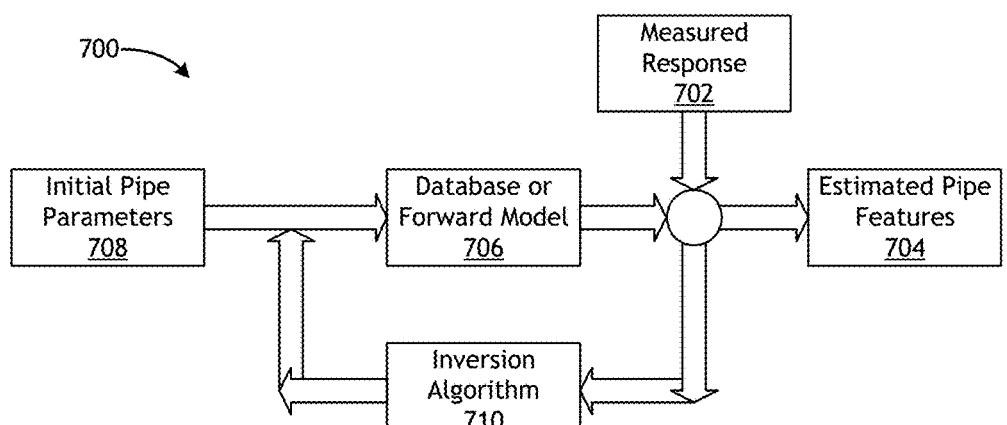
FIG. 7 is a schematic diagram of an exemplary inversion method that may be employed in accordance with the principles of the present disclosure.

FIG. 7 is a schematic diagram of an exemplary inversion method 700 that may be employed in accordance with the principles of the present disclosure. The inversion method 700 may be used to convert measured responses 702 obtained by a pipe inspection tool (i.e., the pipe inspection tool 114 of FIGS. 1 and 2) to estimated various pipe features 704 included on or otherwise associated with one or more wellbore pipes (e.g., the pipes $108_{1-M}$). As indicated, above, such features can either be man-made or caused by corrosion. The estimated pipe features 704 may then be visualized in either a 2D or 3D format, as discussed above.

Some of the pipe features may be known, such as the dimensions of a casing collar, a metal gain or loss section, a deformed section, or a pipe section with perforations. If the pipe features are not pre-known, however, such as sections of the pipe that may have corrosion, cracks, fissures, holes, etc., such features may be evaluated using a proper inversion operation. Performing an inversion operation in accordance with the inversion method 700 may include referencing a database and/or forward model 706 fed with initial pipe parameters 708. As indicated above, the initial pipe parameters 708 can include parameters such as pipe dimensions, pipe materials, pipe magnetic permeability, pipe conductivity, perforation density, perforation count, existence of a pipe collar, pipe collar thickness, etc. The database 706 may include information regarding various pipe characteristics that can be correlated to the measured responses 702. The forward model 706 provides a set of mathematical relationships for sensor responses that can be applied to determining what a selected sensor would measure when monitoring a particular casing or pipe with or without a particular defect.

The measured responses 702 may be acquired at various frequencies (in frequency-domain Eddy current) or time slots (in time-domain Eddy current). The measured responses 702 may either be compared with the pipe characteristics stored in the database 706 (e.g., computed by an accurate forward model or provided by measurements for various combinations of the properties and dimensions of the pipes) or directly with a forward model response 706. An iterative numerical inversion algorithm 710 may then be employed based on the difference between the measured responses 702 and the responses from the database or the forward model 706. In the inversion algorithm 710, the estimate for the features of the pipe is iteratively updated until the difference between the measured responses 702 and the computed responses from the database or the forward model 706 falls below a desired threshold.

In one example of iterative use of the inversion algorithm 710, an initial value or guess of a feature and a forward model 706 may be applied to the initial pipe parameters 708. The forward model 706 provides a response, which is compared with a measured response 702 and a next guess is then generated based on the comparison. This comparison process continues to adjust the guess until the values of the forward model 706 and the measured response 702 agree.

The database 706 can alternatively be used with a pattern-matching inversion method of the inversion algorithm 710. The database 706 may include correspondences between a physical measurement and a property or an identification of the nature of a physical entity (i.e., a casing) that generated a particular electromagnetic field in response to a sensor signal. For example, measurement of a specific voltage or field can be mapped to a specific type of casing, casing dimension, or defect (i.e., corrosion). By comparing the measured value with a library including such values, a feature of the casing, such as a defect, can be obtained from the library by the matching process. In some embodiments, a pattern of measured voltages can be matched to voltages in the database 706 to identify the estimated pipe feature 704

Effects due to the presence of a sensor housing, pad structure, mutual coupling between sensors, mud and cement can be corrected by using a priori information on these parameters. Since all of these effects are mainly additive, they can be removed using proper calibration schemes. Multiplicative (scaling) portion of the effects can be removed in the process of calibration to an existing log. Removal of such effects is also well known in EM well logging, and it will not be detailed in here.

The visualizations techniques disclosed herein can be used to display the results when using a pipe inspection tool (i.e., the pipe inspection tool 114 of FIGS. 1 and 2) that operates according to frequency-domain Eddy current or time-domain Eddy current. Once the inversion results are obtained from the responses acquired by these tools, the identified features can be graphically visualized in any combination of the disclosed methods.

The various embodiments discussed herein may be performed and otherwise executed under computer control, including various blocks, modules, elements, components, and algorithms that can be implemented using computer hardware, software, combinations thereof, and the like. Various illustrative methods and algorithms have been described generally in terms of their functionality, and whether such functionality is implemented as hardware or software will depend upon the particular application and any imposed design constraints. For at least this reason, it is to be recognized that one of ordinary skill in the art can implement the described functionality in a variety of ways for a particular application.

Computer hardware used to implement the various illustrative methods and algorithms described herein can include a processor configured to execute one or more sequences of instructions, programming stances, or code stored on a non-transitory, computer-readable medium. The processor can be, for example, a general purpose microprocessor, a microcontroller, a digital signal processor, an application specific integrated circuit, a field programmable gate array, a programmable logic device, a controller, a state machine, a gated logic, discrete hardware components, an artificial neural network, or any like suitable entity that can perform calculations or other manipulations of data. In some embodiments, computer hardware can further include elements such as, for example, a memory (e.g., random access memory (RAM), flash memory, read only memory (ROM), programmable read only memory (PROM), erasable programmable read only memory (EPROM)), registers, hard disks, removable disks, CD-ROMS, DVDs, or any other like suitable storage device or medium.

Executable sequences described herein can be implemented with one or more sequences of code contained in a memory. In some embodiments, such code can be read into the memory from another machine-readable medium. Execution of the sequences of instructions contained in the memory can cause a processor to perform the process steps described herein. One or more processors in a multi-processing arrangement can also be employed to execute instruction sequences in the memory. In addition, hard-wired circuitry can be used in place of or in combination with software instructions to implement various embodiments described herein. Thus, the present embodiments are not limited to any specific combination of hardware and/or software.

As used herein, a machine-readable medium will refer to any medium that directly or indirectly provides instructions to a processor for execution. A machine-readable medium can take on many forms including, for example, non-volatile media, volatile media, and transmission media. Non-volatile media can include, for example, optical and magnetic disks. Volatile media can include, for example, dynamic memory. Transmission media can include, for example, coaxial cables, wire, fiber optics, and wires that form a bus. Common forms of machine-readable media can include, for example, floppy disks, flexible disks, hard disks, magnetic tapes, other like magnetic media, CD-ROMs, DVDs, other like optical media, punch cards, paper tapes and like physical media with patterned holes, RAM, ROM, PROM, EPROM, and flash EPROM.

Embodiments disclosed herein include:

A. A method that includes conveying a pipe inspection tool including one or more sensors into a wellbore having at least one pipe, transmitting one or more excitation signals from a transmitter antenna of the pipe inspection tool and measuring a plurality of response signals derived from the one or more excitation signals with the one or more sensors, processing the plurality of response signals and thereby obtaining a plurality of measured responses, generating a map of the at least one pipe based on the plurality of measured responses, wherein the map is divided into a plurality of pipe ranges extending along an axial length of the at least one pipe and each pipe range corresponds to a percentage of metal loss in the at least one pipe, assigning a photorealistic image to each pipe range based on the percentage of metal loss, generating a first two-dimensional (2D) image or a first three-dimensional (3D) image using the map, where the first 2D or 3D image is constructed as a combination of each photorealistic image, and graphically visualizing the first 2D or 3D image.

B. A non-transitory, computer readable medium programmed with computer executable instructions that, when executed by a processor of a computer unit, perform the steps of processing a plurality of response signals derived from one or more sensors of a pipe inspection tool and thereby obtaining a plurality of measured responses corresponding to at least one pipe positioned in a wellbore, generating a map of the at least one pipe based on the plurality of measured responses, wherein the map is divided into a plurality of pipe ranges extending along an axial length of the at least one pipe and each pipe range corresponds to a percentage of metal loss in the at least one pipe, assigning a photorealistic image to each pipe range based on the percentage of metal loss, generating a first two-dimensional (2D) image or a first three-dimensional (3D) image using the map, where the first 2D or 3D image is constructed as a combination of each photorealistic image, and graphically visualizing the first 2D or 3D image.

C. A method that includes conveying a pipe inspection tool including one or more sensors into a wellbore having at least a first pipe positioned within a second pipe, transmitting an excitation signal from a transmitter antenna of the pipe inspection tool and measuring a response signal derived from the excitation signal with the one or more sensors, processing the response signal to obtain a measured response corresponding to one or more features of at least one of the first and second pipes, and displaying the one or more features in a two-dimensional (2D) image or a three-dimensional (3D) image, where the one or more features are displayed using at least one of colors and shading representative of the one or more features.

Each of embodiments A, B, and C may have one or more of the following additional elements in any combination: Element 1: wherein the photorealistic image of one or more of the pipe ranges comprises an actual photograph of a real pipe having a defect. Element 2: wherein the photorealistic image of one or more of the pipe ranges comprises a shaded or colored rendering of a 3D pipe model. Element 3: wherein assigning the photorealistic image to each pipe range comprises obtaining the photorealistic image from a projection of a 3D pipe model, and mapping the photorealistic image based on pipe parameters of the at least one pipe that are similar to pipe parameters of the 3D pipe model. Element 4: wherein the pipe parameters of the at least one pipe are selected from the group consisting of pipe thickness, pipe diameter, pipe magnetic permeability, pipe eccentricity, pipe conductivity, defect size, perforation density, perforation count, existence of a pipe collar, and pipe collar thickness. Element 5: wherein the at least one pipe is a first pipe arranged within a second pipe, the method further comprising generating a map of the second pipe based on the measured responses, the map being divided into a plurality of pipe ranges extending along an axial length of the second pipe and each pipe range of the second pipe corresponding to a percentage of metal loss in the second pipe, assigning a photorealistic image to each pipe range of the second pipe based on the percentage of metal loss, generating a second 2D image or a second 3D image using the map of the second pipe, where the second 2D or 3D image is constructed as a collage of each photorealistic image of each pipe range of the second pipe. Element 6: further comprising combining the first 2D or 3D image and the second 2D or 3D image and thereby generating a third 2D image or a third 3D image. Element 7: wherein combining the first 2D or 3D image and the second 2D or 3D image comprises at least one of stretching the first 2D or 3D image on top of the second 2D or 3D image, and overlaying the first 2D or 3D image on top of the second 2D or 3D image. Element 8: further comprising graphically visualizing the second 2D or 3D image. Element 9: further comprising graphically visualizing the first 2D or 3D image and the second 2D or 3D image in a multi-layer image format. Element 10: further comprising graphically visualizing the first 2D or 3D image and the second 2D or 3D image in a separate image format. Element 11: wherein generating the first 2D or 3D image comprises generating one or more sets of depths corresponding to one or more ranges of pipe parameters and based on a given thickness loss profile of the at least one pipe, grouping consecutive sets of depths of the one or more sets of depths into corresponding pipe ranges, and generating in a plot a photorealistic image corresponding to each range of pipe parameters and in each pipe range. Element 12: wherein generating the map of the at least one pipe based on the plurality of measured responses comprises applying an inversion algorithm to the plurality of measured response and thereby obtaining an equivalent amount of metal loss, and assigning the photorealistic image to each pipe range based on the equivalent amount of metal loss. Element 13: wherein the first 2D or 3D image is displayed as a 3D image, the method further comprising rotating the at least one pipe in the 3D image and thereby viewing the first and second pipes from different azimuthal angles. Element 14: wherein the one or more sensors comprises an azimuthally distributed sensor array. Element 15: wherein the pipe inspection tool is one of a frequency-domain Eddy current tool or a time-domain Eddy current tool. Element 16: wherein each photorealistic image of the first 2D or 3D image includes a common longitudinal axis that corresponds with a depth along a portion of the wellbore. Element 17: further comprising undertaking a downhole operation based on analysis of the first 2D or 3D image.

Element 18: wherein displaying the one or more features in the 2D image or the 3D image comprises estimating the one or more features using an inversion algorithm and thereby obtaining one or more estimated pipe features, and displaying an image of the one or more features based on the one or more estimated pipe features. Element 19: wherein the one or more features comprise one or more perforations and displaying the one or more features comprises at least one of displaying an image of the one or more perforations based on a pre-known size of the one or more perforations, displaying an image of the one or more perforations based on size results obtained from an inversion algorithm, and displaying an image of the one or more perforations based on an arbitrary size for the one or more perforations. Element 20: wherein displaying the one or more features comprises applying an inversion algorithm to the measured response and thereby obtaining an equivalent amount of metal loss, and graphically visualizing the one or more features as proportional to the equivalent amount of metal loss. Element 21: further comprising graphically visualizing the one or more features in a multi-layer image format. Element 22: further comprising graphically visualizing the one or more features in a separate image format. Element 23: wherein the one or more features are displayed in a 3D image and the method further comprises rotating the first and second pipes in the 3D image and thereby viewing the first and second pipes from different azimuthal angles. Element 24: wherein the one or more sensors comprises an azimuthally distributed sensor array. Element 25: wherein the one or more features are selected from the group consisting of a pipe collar, a metal gain region, a metal loss region, a deformed region, one or more perforations, corrosion, a crack, a fissure, and a hole. Element 26: wherein the pipe inspection tool is one of a frequency-domain Eddy current tool or a time-domain Eddy current tool.

By way of non-limiting example, exemplary combinations applicable to A, B, and C include: Element 3 with Element 4; Element 5 with Element 6; Element 6 with Element 7; Element 5 with Element 8; Element 8 with Element 9; and Element 8 with Element 10.

Therefore, the disclosed systems and methods are well adapted to attain the ends and advantages mentioned as well as those that are inherent therein. The particular embodiments disclosed above are illustrative only, as the teachings of the present disclosure may be modified and practiced in different but equivalent manners apparent to those skilled in the art having the benefit of the teachings herein. It is therefore evident that the particular illustrative embodiments disclosed above may be altered, combined, or modified and all such variations are considered within the scope of the present disclosure. The systems and methods illustratively disclosed herein may suitably be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

As used herein, the phrase "at least one of" preceding a series of items, with the terms "and" or "or" to separate any of the items, modifies the list as a whole, rather than each member of the list (i.e., each item). The phrase "at least one of" allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

What is claimed is:

1. A method, comprising:
   conveying a pipe inspection tool including one or more sensors into a wellbore having at least one pipe;
   transmitting an excitation signal from a transmitter antenna of the pipe inspection tool and measuring a plurality of response signals derived from the excitation signal with the one or more sensors;
   processing the plurality of response signals and thereby obtaining a plurality of measured responses;
   generating a map of the at least one pipe based on the plurality of measured responses, wherein the map is divided into a plurality of pipe ranges extending along an axial length of the at least one pipe and each pipe range corresponds to a percentage of metal loss in the at least one pipe;
   assigning a photorealistic image to each pipe range based on the percentage of metal loss;
   generating a first two-dimensional image or a first three-dimensional image using the map, where the first two-dimensional image or the first three-dimensional image is constructed as a combination of multiple photorealistic images; and graphically visualizing the first two-dimensional image or the first three-dimensional image by mapping each of multiple sections of the pipe along an axis indicative of a range of a pipe characteristic sorted according to a parameter value of the photorealistic image, wherein the parameter value corresponds to an electromagnetic or a geometric property of the pipe.

2. The method of claim 1, wherein the photorealistic image comprises an actual photograph of a real pipe having a defect.

3. The method of claim 1, wherein the photorealistic image comprises a shaded or colored rendering of a three-dimensional pipe model.

4. The method of claim 1, wherein assigning the photorealistic image to each pipe range comprises:

obtaining the photorealistic image from a projection of a three-dimensional pipe model; and mapping the photorealistic image based on a pipe parameter of the at least one pipe that are similar to a pipe parameter of the three-dimensional pipe model.

5. The method of claim 4, wherein the pipe parameters of the at least one pipe are selected from the group consisting of pipe thickness, pipe diameter, pipe magnetic permeability, pipe eccentricity, pipe conductivity, defect size, perforation density, perforation count, existence of a pipe collar, and pipe collar thickness.

6. The method of claim 1, wherein the at least one pipe is a first pipe arranged within a second pipe, the method further comprising:

generating a map of the second pipe based on the measured responses, the map being divided into a plurality of pipe ranges extending along an axial length of the second pipe and each pipe range of the second pipe corresponding to a percentage of metal loss in the second pipe;

assigning a photorealistic image to each pipe range of the second pipe based on the percentage of metal loss; and generating a second two-dimensional image or a second three-dimensional image using the map of the second pipe, where the second two-dimensional image or the second three-dimensional image is constructed as a collage of each photorealistic image of each pipe range of the second pipe.

7. The method of claim 6, further comprising combining the first two-dimensional image or first three-dimensional image and the second two-dimensional image or second three-dimensional image and thereby generating a third two-dimensional image or a third three-dimensional image.

8. The method of claim 7, wherein combining the first two-dimensional image or image and the second two-dimensional image or the first three-dimensional image comprises at least one of:

stretching the first two-dimensional image or first three-dimensional image on top of the second two-dimensional image or the second three-dimensional image; and overlaying the first two-dimensional image or the first three-dimensional image on top of the second two-dimensional image or the second three-dimensional image.

9. The method of claim 6, further comprising graphically visualizing the second two-dimensional image or the second three-dimensional image.

10. The method of claim 9, further comprising graphically visualizing the first two-dimensional image or the first three-dimensional image and the second two-dimensional image or the second three-dimensional image in a multi-layer image format.

11. The method of claim 9, further comprising graphically visualizing the first two-dimensional image or the first three-dimensional image and the second two-dimensional image or the second three-dimensional image in a separate image format.

12. The method of claim 1, wherein generating the first two-dimensional image or the first three-dimensional image comprises:

generating one or more sets of depths corresponding to one or more ranges of pipe parameters and based on a given thickness loss profile of the at least one pipe;

grouping consecutive sets of depths of the one or more sets of depths into corresponding pipe ranges; and generating in a plot a photorealistic image corresponding to each range of pipe parameters and in each pipe range.

13. The method of claim 1, wherein generating the map of the at least one pipe based on the plurality of measured responses comprises:

applying an inversion algorithm to the plurality of measured response and thereby obtaining an equivalent amount of metal loss; and assigning the photorealistic image to each pipe range based on the equivalent amount of metal loss.

14. The method of claim 1, wherein the first two-dimensional image or the first three-dimensional image is displayed as a three-dimensional image, the method further comprising rotating the at least one pipe in the three-dimensional image and thereby viewing a first pipe and a second pipe from different azimuthal angles.

15. The method of claim 1, wherein the one or more sensors comprises an azimuthally distributed sensor array.

16. The method of claim 1, wherein the pipe inspection tool is one of a frequency-domain Eddy current tool or a time-domain Eddy current tool.

17. The method of claim 1, wherein each photorealistic image of the first two-dimensional image or the first three-dimensional image includes a common longitudinal axis that corresponds with a depth along a portion of the wellbore.

18. The method of claim 1, further comprising undertaking a downhole operation based on analysis of the first two-dimensional image or the first three-dimensional image.

19. A non-transitory, computer readable medium programmed with computer executable instructions that, when executed by a processor of a computer unit, perform the steps of:

processing a plurality of response signals derived from one or more sensors of a pipe inspection tool and thereby obtaining a plurality of measured responses corresponding to at least one pipe positioned in a wellbore;

generating a map of the at least one pipe based on the plurality of measured responses, wherein the map is divided into a plurality of pipe ranges extending along an axial length of the at least one pipe and each pipe range corresponds to a percentage of metal loss in the at least one pipe;

assigning a photorealistic image to each pipe range based on the percentage of metal loss;

generating a first two-dimensional image or a first three-dimensional image using the map, where the first two-dimensional image or the first three-dimensional image is constructed as a combination of each photorealistic image; and graphically visualizing the first two-dimensional image or the first three-dimensional image by mapping each of multiple sections of the pipe along an axis indicative of a range of a pipe characteristic sorted according to a parameter value of the photorealistic image, wherein the parameter value corresponds to an electromagnetic or a geometric property of the pipe.

* * * * *